United States Patent [19]

Schiffman

[11] Patent Number: 4,826,824

[45] Date of Patent: May 2, 1989

[54] METHOD OF ENHANCING THE TASTE PERCEPTION OF SWEETNESS OF ASPARTAME AND DERIVATIVES THEREOF

[75] Inventor: Susan Schiffman, Durham, N.C.

[73] Assignee: Duke University, Durham, N.C.

[21] Appl. No.: 791,564

[22] Filed: Oct. 25, 1985

[51] Int. Cl.$^4$ .............................................. A61K 31/70
[52] U.S. Cl. ....................................... 514/47; 514/45; 514/46; 514/48; 426/548
[58] Field of Search ..................... 426/548; 514/48, 47, 514/45, 46

[56] References Cited

U.S. PATENT DOCUMENTS

| | | |
|---|---|---|
| 3,904,655 | 9/1975 | van den Ouweland et al. ... 549/478 |
| 4,399,162 | 8/1983 | Okada ................................. 426/548 |

Primary Examiner—Johnnie R. Brown
Assistant Examiner—Elli Peselev
Attorney, Agent, or Firm—Oblon, Fisher, Spivak, McClelland & Maier

[57] ABSTRACT

A method for enhancing the ability to perceive the sweetness taste of aspartame or derivatives thereof in mammals, which entails exposing all or a portion of the mammalian tongue to an effective amount of a purinergic nucleotide having at least one phosphate group.

7 Claims, No Drawings

METHOD OF ENHANCING THE TASTE PERCEPTION OF SWEETNESS OF ASPARTAME AND DERIVATIVES THEREOF

The investigations leading to the present invention were supported by Grant No. NIA AG 00443 from the National Institutes of Health.

BACKGROUND OF THE INVENTION

1. Field of the Invention

The present invention relates to a method of enhancing the taste perception of sweetness of aspartame.

2. Discussion of the Background

Organic compounds, other than carbohydrates, that taste sweet have been known for centuries. However, the standard for sweetness has been and remains sucrose, both in terms of quality of taste and taste profile. For example, many compounds reported to be sweet have peculiar non-sucrose-like flavors. Moreover, sweetness may coexist with other tastes, such as licorice or menthol. Further, some compounds have an unpleasant lingering bitter flavor or aftertaste. For example, both saccharin and cyclamate produce a bitter metallic aftertaste in practically all tasters at a sufficiently high concentration. *Encyclopedia of Chemical Technology*, Vol. 22, "Sweeteners" (Kirk-Othmer 1980).

At present, a satisfactory theory explaining the structure-activity relationships of compounds perceived to be sweet is lacking. Investigations from a range of disciplines, including organic and medicinal chemistry, biochemistry, neurophysiology, psychophysics and biophysics, suggest that there are probably a multiplicity of sweet receptor types each with its own stereochemical and physicochemical requirements. Hence, if a theory is formulated which is broad enough to encompass diverse molecular structures, then many compounds which would be predicted to be sweet are not. Alternatively, it is found that if data of a certain series of compounds can be well accommodated, then structures outside the compound series may not fit the model. To be sure, such theories and correlations lack useful predictive value. Thus, at present, it is not possible to rationally design a compound with a molecular structure having a predictable sweet taste. *Encyclopedia of Chemical Technology*, id.

Aspartame has been found to be a suitable substitute sweetener for a wide variety of foods because of its sucrose-like taste as well as its ability to blend well with other food flavors. However, despite its wide spread use as a substitute sweetener, it is expensive to produce.

Hence, despite the fact that aspartame is being widely used to replace sucrose at present, it would be extremely desireable to be able to use lesser amounts of the sweetener.

Accordingly, a need continues to exist for a method whereby the sweetening effects of aspartame and derivatives thereof could be attained at a lower concentration of the same.

SUMMARY OF THE INVENTION

Accordingly, it is an object of the present invention to provide a method of enhancing the sweetness of aspartame and derivatives thereof by enhancing the taste perception of sweetness of aspartame in mammals.

It is also an object of this invention, particularly, to enhance the taste perception of sweetness of aspartame and derivatives thereof in humans.

Further, it is an object of the present invention to provide compounds for effecting the described taste perception enhancement.

It is also an object of this invention to provide food substances containing the compounds of the present invention.

According to the present invention, the foregoing and other objects are attained by a method for enhancing the ability to perceive the sweetness taste of aspartame and derivatives thereof in mammals, which entails exposing all or a portion of the mammalian tongue to an effective amount of a purinergic nucleotide having at least one phosphate group.

DETAILED DESCRIPTION OF THE PREFERRED EMBODIMENTS

Recently, the present inventor adduced data which suggests that the adenosine receptor, which is known to play a significant role in a variety of biological processes, also appears to play a role in taste perception of sweeteners. Two subtypes of cell surface adenosine receptors, $A_1$ (inhibitory) and $A_2$ (excitatory) receptors, have been postulated. The $A_1$ types are high affinity receptors that show half maximal responses at nanomolar concentrations; while half maximal responses for $A_2$ receptors are found at concentrations 100 to 1,000 times higher in the micromolar range. The present inventor has found that methyl xanthines, including caffeine, theophylline and theobromine, are potent antagonists of adenosine receptors.

Adaptation of the human tongue to methyl xanthines having concentrations ranging from $10^{-5}M$ to $10^{-2}M$ has recently been shown, by the present inventor, to potentiate certain tastes. *Pharmacol. Biochem. Behav.*, S. S. Schiffman et al, 22, 195–203 (1985). Of the five stimuli tested, NaCl, quinine HCl, KCl, urea and acesulfam K, the greatest taste potentiation by methyl xanthines, in fact, approximately 100%, was found for the artificial sweetener acesulfam K, which had a bitter component in addition to sweetness.

This methyl xanthine-enhanced response to sweeteners has been further confirmed, by the present inventor, by electrophysiological data in rats. The animal data, however, reveals that neural responses in nucleus tractus solitarius for one sweetener, stevioside, were greatly potentiated by $10^{-5}M$ caffeine, while sucrose was unaffected. Such a result clearly seems to suggest that the effect of the methyl xanthines is not uniform across sweeteners.

The present inventor has also demonstrated that $10^{-5}M$ caffeine enhances the taste of some sweeteners including neohesperidin dihydrochalcone, D-tryptophan, thaumatin, stevioside, and sodium saccharin. Adenosine reversed this potentiation. However, four sweeteners, perhaps some of the more commercially popular sweeteners, aspartame, sucrose, fructose and calcium cyclamate, appear to be completely unaffected by caffeine.

However, the present inventor has now discovered that certain purinergic nucleotides enhance the perception of sweetness of aspartame, and derivatives thereof but with no measurable effect on other artificial sweeteners having bitter components such as sodium saccharin.

Actually, since 1969, it has been known that a 50:50 mixture of 5' disodium inosinate and 5'-disodium guanylate has the ability to potentiate the sweetness of a 5% sucrose solution. See *Food Technology*, Vol. 23, 32–37

(November 1969). However, no substances have ever been known to potentiate the sweetness of aspartame.

In accordance with the present invention, it has now been discovered that, for example, inosine monophosphate, inosine diphosphate, inosine triphosphate, guanosine monophosphate, guanosine diphosphate, guanosine triphosphate, adenosine monophosphate, adenosine diphosphate or adenosine triphosphate potentiate the sweetness of aspartame. However, other purinergic nucleotide derivatives may be used.

In order to potentiate the sweetness of aspartame in accordance with the present invention, the mammalian tongue or a portion thereof is generally exposed to a concentration of about $10^{-6}$M to $10^{-1}$M of the purinergic nucleotides of the present invention. However, it is preferred if the exposure is to a concentration of about $10^{-4}$ to $10^{-2}$M of the same.

As noted, in accordance with the present invention, virtually any purinergic nucleotide will potentiate the sweetness of aspartame and derivatives thereof. This suggests that the purinergic receptors are involved in taste reception either by antagonism with caffeine or direct stimulation with a purinergic ribonucleotide.

However, particularly with mentioning as purinergic nucleotides are inosine monophosphate, inosine diphosphate, inosine triphosphate, guanosine monophosphate, guanosine diphosphate, guanosine triphosphate, adenosine monophosphate, adenosine diphosphate, adenosine triphosphate, monophosphates, diphosphates and triphosphates of xanthine, as well as deoxy-5'-guanylate, 2-methyl-5'-inosinate, 2-ethyl-5'-inosinate, 2-methylthio-5'-inosinate, 2-ethylthio-5'-inosinate, 2-methoxy-5'-inosinate, 2-chloro-5'-inosinate, 2-N-methyl-5'-guanylate, 2-N,N-dimethyl-5'-guanylate, N-methyl-5'-inosinate, N-methyl-5'-guanylate, $N^1$-methyl-2-methylthio-5'-inosinate, 6-chloropurine riboside-5'-phosphate, 6-mercaptopurine riboside-5'-phosphate, 2-methyl-6-mercaptopurineriboside-5'-phosphate and 2-methylthio-6-mercaptopurine-riboside-5'-phosphate.

Of course, in addition to the above specific compounds, it is noted that, in general, the 2-deoxyadenosine, 2-deoxyguanosine or 2-deoxyinosine mono-, di- or triphosphates may also be used. It is also within the ambit of the present invention to use cyclic phosphates such as adenosine 3', 5'- and 2', 3'-phosphoric acid.

It should also be noted that the compounds of the present invention may have one or more phosphate groups at one or more of the 2'-, 3'- or 5'- positions on the ribose or deoxyribose ring.

Further, it is noteworthy that the 1-, 2-, 3- or 4-positions of the ribose ring or the deoxyribose ring may either contain the unsubstituted substituents —H or —OH, or they may contain other substituents such as one or more lower alkyl groups of 1 to 6 carbons, which themselves are either unsubstituted or substituted with one or more of chloro, hydroxy, thiol, carboxylic acid or lower alkyl carboxylic acid ester groups.

As representative of the compounds of the present invention, it has been found that inosine monophosphate enhances the sweetness of aspartame by about 40%. This measurement was obtained as follows:

EXAMPLE

The subjects were 10 Duke University undergraduate students aged 19-22 who had prior experience in taste experiments. Inosine monophosphate (IMP) was obtained from Sigma Chemical Co. and dissolved in deionized water. Subjects were required to match the perceived intensity of an aspartame concentration presented simultaneously with a $10^{-3}$M solution of IMP.

Essentially, pieces of chromatography paper (Whatman No. 1, 0.16-mm thickness) cut in the shape of half tongues were soaked in either $10^{-3}$M IMP or deionized water (control) for 10 minutes. Then, two pieces of chromatography paper, are impregnated with $10^{-3}$ IMP and a water control, were applied to the tongue for 2 minutes. This set was removed and replaced by a fresh set for another 2 minutes. This constituted a total application time of 4 minutes.

The aspartame was then delivered to the tongue in ½ inch circles of chromatography paper. A standard concentration to be matched was dissolved in $10^{-3}$M IMP and placed on the side of the tongue adapted to IMP. The concentration of the test stimulus on the other side was adjusted until a concentration was found that matched the intensity of the standard dissolved in IMP. Using this procedure, a potentiation effect of 40% was observed.

It is noted that the details of the above technique are generally described at *Proc. Natl. Acad. Sci.*, 1983, 80, 6136–6140, S. S. Schiffman et al.

The compounds of the present invention may be added to aspartame-containing food substances or aspartame-containing beverage substances in order to reduce the content of aspartame needed to attain a certain level of sweetness. In fact, the compounds of the present invention may be used to enhance the ability to perceive aspartame sweetness by applying the same to the mammalian tongue prior to exposing the same to the food or beverage-substance sweetened with aspartame. Alternatively, the compounds of the present invention may be used with the food or beverage-substances to enhance not only the ability to perceive but the perception of aspartame sweetness as well.

In preparing food or beverage substances in accordance with the present invention, these substances should be prepared such that when consuming the same, a concentration in the range of $10^{-6}$M to $10^{-1}$M for the present compounds can be maintained on the mammaliam tongue. However, it is preferred if this concentration is in the range of $10^{-4}$M to $10^{-2}$M.

Of course, inasmuch as aspartame is known to modify the flavors of other flavoring ingredients, the compounds of the present invention may be used in conjunction with not only apsartame, but also with any other such flavoring ingredient.

In determining the precise amounts of the present compounds which should be added to the aspartame-containing food substances or beverages, the above recited concentration ranges should be borne in mind. For beverages, these concentrations may be used as such in the same. With dry foods, it is necessary to approximate the amounts necessary to attain such concentrations in the mammalian mouth. Such approximations, of course, depend upon the amount of food substance used.

Of course, the present compounds may be used directly in conjunction with aspartame as a new substitute sweetener. As such, the present compounds can be mixed with aspartame or derivatives thereof in almost any proportion, such as using the present compounds in an amount of about 1% to 99% based upon the total mixture content.

As noted, the present compounds potentiate the sweetness of aspartame and derivatives thereof. The term "derivatives thereof" is meant to specifically include all structurally modified aspartame-based compounds which have a retained, enhanced or even a diminished sweetness when tasted. It is particularly important to note that the present invention specifically contemplates the inclusion of these compounds within the ambit of the same for much work hs been recently conducted using modified aspartames in order to stablize the sweetener molecule under the more aggressive conditions encountered in baking. Such modifications are known and are within the ambit of those skilled in the art.

Having now fully described the present invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for enhancing the perception of the sweetness taste of aspartame or derivatives thereof in mammals, which entails exposing all or a portion of the mammalian mouth, either prior to or concomitantly with a food- or beverage-substance containing aspartame or a derivative thereof, to an effective amount of one or more free purinergic nucleotides which are selected from the group consisting of inosine diphosphate, inosine triphosphate, guanosine diphosphate, quanosine triphosphate, adenosine monophosphate, adenosine diphosphate, adenosine triphosphate, monophosphates, diphosphates or triphosphates of xanthine, deoxy-5'-guanylate, 2-methyl-5'-inosinate, 2-ethyl-5'-inosinate, 2-methylthio-5'-inosinate, 2-ethylthio-5'-inosinate, 2-methoxy-5'-inosinate, 2-chloro-5'-inosinate, 2-N-methyl-5'-guanylate, 2-N,N-dimethyl-5'-guanylate, N'-methylthio-5'-inosinate, 6-chloropurine riboside-5'-phosphate, 6-mercaptopurine riboside-5'-phosphate, 2-methyl-6-mercaptopurine-riboside-5'-phosphate, and 2-methylthio-6-mercaptopurine-riboside-5'-phosphate.

2. The method according to claim 1, wherein aid mammal is a human.

3. The method according to claim 1, wherein said effective amount of said purinergic nucleotide is concentration of about $10^{-6}$M to $10^{-1}$M in the mouth.

4. A food- or beverage-substance for mammals, consisting essentially of a food- or beverage-substance, aspartame or a derivative thereof or a combination thereof and an effective amount of one or more purinergic nucleotides being selected from the group consisting of inosine diphosphate, inosine triphosphate, guanosine diphosphate, guanosine triphosphate, adenosine diphosphate, adenosine triphosphate, monophosphates, diphosphates or triphosphates of xanthine, deoxy-5'-guanylate, 2-methyl-5'-inosinate, 2-ethyl-5'-inosinate, 2-methylthio-5'-inosinate, 2-ethylthio-5'-inosinate, 2-methoxy-5'-inosinate, 2-chloro-5'-inosinate, 2-N-methyl-5'-guanylate, 2-N,N-dimethyl-5'-guanylate, N'-methylthio-5'-inosinate, 6-chloropurine riboside-5'-phosphate, 6-mercaptopurine riboside-5'-phosphate, 2-methyl-6-mercaptopurine-riboside 5'-phosphate and 2-methylthio-6-mercaptopurine-riboside-5'-phosphate.

5. The food or beverage substance according to claim 4, wherein an amount of said purinergic nucleotide isused sufficient to provide a concentration thereof of about $10^{-6}$M to $10^{-1}$M in the mouth of the mammal consuming said substance.

6. A sweetener composition, consisting essentially of, aspartame or a derivative thereof in an amount effective for enhancing the taste of aspartame or a derivative thereof in mammals and an effective amount of one or more free purinergic nucleotides being selected from the group consisting of inosine diphosphate, inosine triphosphate, guanosine diphosphate, guanosine triphosphate, adenosine diphosphate, adenosine triphosphate, monophosphates, diphosphates or triphosphates of xanthine, deoxy-5'-guanylate, 2-methyl-5'-inosinate, 2-ethyl-5'-inosinate, 2-methylthio-5'-inosinate, 2-ethylthio-5'-inosinate, 2-methoxy-5'-inosinate, 2-chloro-5'-inosinate, 2-N-methyl-5'-guanylate, 2-N-dimethyl-5'-guanylate, N'-methylthio-5'-inosinate, 6-chloropurine riboside-5'-phosphate, 6-mercaptopurine riboside-5'-phosphate, 2-methyl-6-mercaptopurine-riboside-5'-phosphate, and 2-methylthio-6-mercaptopurine-riboside-5'-phosphate.

7. The sweetener composition according to claim 6, wherein an amount of said purinergic nucleotide is used sufficient to provide a concentration thereof of about $10^{-6}$M to $10^{-1}$M in the mouth of the mammal consuming the sweetener composition.

* * * * *